United States Patent
Tanaka et al.

(10) Patent No.: US 12,319,788 B2
(45) Date of Patent: Jun. 3, 2025

(54) PHOSPHORYLCHOLINE GROUP-CONTAINING POLYSILOXANE MONOMER

(71) Applicant: NOF CORPORATION, Shibuya-ku (JP)

(72) Inventors: Yoshiki Tanaka, Kawasaki (JP); Shu Takashima, Oita (JP); Norio Iwakiri, Kawasaki (JP); Yosuke Matsuoka, Kawasaki (JP)

(73) Assignee: NOF CORPORATION, Shibuya-ku (JP)

( * ) Notice: Subject to any disclaimer, the term of this patent is extended or adjusted under 35 U.S.C. 154(b) by 584 days.

(21) Appl. No.: 17/783,169

(22) PCT Filed: Dec. 21, 2020

(86) PCT No.: PCT/JP2020/047693
§ 371 (c)(1),
(2) Date: Jun. 7, 2022

(87) PCT Pub. No.: WO2021/132161
PCT Pub. Date: Jul. 1, 2021

(65) Prior Publication Data
US 2023/0035695 A1     Feb. 2, 2023

(30) Foreign Application Priority Data
Dec. 27, 2019   (JP) .................. 2019-239653

(51) Int. Cl.
| | | |
|---|---|---|
| *C08G 77/395* | (2006.01) | |
| *C08F 230/08* | (2006.01) | |
| *C08F 290/06* | (2006.01) | |
| *C08G 77/26* | (2006.01) | |
| *C08G 77/30* | (2006.01) | |
| *C08G 77/388* | (2006.01) | |

(52) U.S. Cl.
CPC .......... *C08G 77/395* (2013.01); *C08F 230/08* (2013.01); *C08F 290/068* (2013.01); *C08G 77/26* (2013.01); *C08G 77/30* (2013.01); *C08G 77/388* (2013.01)

(58) Field of Classification Search
CPC ...... C08G 77/26; C08G 77/30; C08G 77/388; C08G 77/395; C08F 230/08
USPC ....................................................... 526/279
See application file for complete search history.

(56) References Cited

U.S. PATENT DOCUMENTS

| | | | |
|---|---|---|---|
| 2006/0020098 A1 | 1/2006 | Miyazawa et al. | |
| 2012/0136087 A1 | 5/2012 | Parakka et al. | |
| 2013/0172574 A1* | 7/2013 | Ting ................ | G02B 1/043 548/406 |
| 2014/0135408 A1* | 5/2014 | Wang .................. | C08G 77/392 556/439 |

FOREIGN PATENT DOCUMENTS

| | | | | |
|---|---|---|---|---|
| JP | 2533772 B2 * | 9/1996 | .......... | C08G 77/395 |
| JP | 9-296019 A | 11/1997 | | |
| JP | 2004-175830 A | 6/2004 | | |
| JP | 2006-199749 A | 8/2006 | | |
| JP | 2007-9060 A | 1/2007 | | |
| JP | 2007-197513 A | 8/2007 | | |
| JP | 4245336 B2 * | 3/2009 | ............. | A61K 8/896 |
| JP | 4573376 B2 * | 11/2010 | ................ | C08F 8/44 |
| JP | 2013-139567 A | 7/2013 | | |
| JP | 2014-89477 A | 5/2014 | | |
| JP | 2015-110534 A | 6/2015 | | |
| JP | 2016-53165 A | 4/2016 | | |
| TW | 201941762 A | 11/2019 | | |
| WO | WO-2008023604 A1 * | 2/2008 | ............. | A61L 27/50 |
| WO | WO 2010/104000 A1 | 9/2010 | | |
| WO | WO 2019/194264 A1 | 10/2019 | | |

OTHER PUBLICATIONS

Machine transaltion of JP 2533772 (no date).*
Machine transation of WO 2008/023604 (no date).*
Machine translation of JP 4245336 (no date).*
Machine translation of JP 4573376 (no date).*
International Search Report issued Mar. 2, 2021 in PCT/JP2020/047693, filed on Dec. 21, 2020, citing documents AA-AC & AO-AT therein, 2 pages.
Indian Office Action issued Sep. 18, 2024 in Indian Patent Application No. 202217036061, received on Oct. 8, 2024, citing document 15 therein, 5 pages.
Combined Taiwanese Office Action and Search Report issued Oct. 30, 2024 in Taiwanese Patent Application No. 109145325 (with English translation of Category of Cited Documents), citing document 15 therein, 6 pages.

* cited by examiner

*Primary Examiner* — Marc S Zimmer
(74) *Attorney, Agent, or Firm* — Oblon, McClelland, Maier & Neustadt, L.L.P.

(57) ABSTRACT

The phosphorylcholine group-containing polysiloxane monomer of the present invention is represented by the formula (1). In the formula, a represents an integer of 20 to 500, b represents an integer of 1 to 70, c represents an integer of 1 to 70, d represents 0 or 1, p and q each represent 0 or 1, X represents —$CH_2$— or —$CH_2CH_2$—, and R represents an alkyl group having 2 to 18 carbon atoms. The present invention provides the phosphorylcholine group-containing polysiloxane monomer which gives, when copolymerized with a polymerizable monomer such as methacrylic acid or a hydrophilic monomer other than methacrylic acid, a polymer that exhibits surface hydrophilicity and sufficient stability as ophthalmic devices.

4 Claims, No Drawings

PHOSPHORYLCHOLINE GROUP-CONTAINING POLYSILOXANE MONOMER

TECHNICAL FIELD

The present invention relates to a phosphorylcholine group-containing polysiloxane monomer capable of producing, for example, ophthalmic devices such as contact lenses, intraocular lenses and artificial corneas, by copolymerizing with a hydrophilic monomer and the like, and to a method for producing the same.

BACKGROUND ART

A silicone hydrogel is a material which has a low burden on the eye due to its high oxygen permeability and is currently widely used for ophthalmic lenses such as contact lenses. On the other hand, since the silicone hydrogel contains a water-repellent silicone, wettability and lubricity are likely to be insufficient. Therefore, surface hydrophilization by a surface modification method and surface hydrophilization by mixing a hydrophilic monomer in a lens composition before curing have been investigated.

A phosphorylcholine group is known to have excellent properties that exhibit biocompatibility and very high hydrophilicity. Therefore, a method of improving hydrophilicity of a lens surface using a phosphorylcholine group-containing methacrylic ester monomer (MPC) has been proposed. However, since the phosphorylcholine group-containing monomer has high hydrophilicity, compatibility thereof with a hydrophobic silicone is poor. Given the situation, PTLs 1 to 4 disclose a monomer composition containing a hydroxy group-having silicone monomer and MPC, and it is becoming possible to obtain silicone hydrogel lenses having high surface hydrophilicity.

Further, as a method for improving hydrophilicity of a lens surface, use of methacrylic acid is investigated. Methacrylic acid has a high hydrophilicity than ordinary hydrophilic monomers, and therefore incorporation thereof in lenses is expected to further improve hydrophilicity. However, methacrylic acid is poor in compatibility with the silicone portion in a lens, and therefore has a problem in stability. Therefore, it is necessary to investigate the use of methacrylic acid.

CITATION LIST

Patent Literature

PTL 1: JP2007-009060(A)
PTL 2: JP2007-197513(A)
PTL 3: JP2014-089477(A)
PTL 4: WO2010/104000(A1)

SUMMARY OF INVENTION

Technical Problem

An object of the present invention is to provide a phosphorylcholine group-containing polysiloxane monomer which, when copolymerized with methacrylic acid or a hydrophilic monomer other than methacrylic acid, can provide a polymer that exhibits surface hydrophilicity and sufficient stability for ophthalmic devices.

Solution to Problem

The present inventors have assiduously studied and, as a result, have confirmed that the phosphorylcholine group-containing polysiloxane monomer represented by the formula (1) can solve the above-mentioned problem, and have completed the present invention.

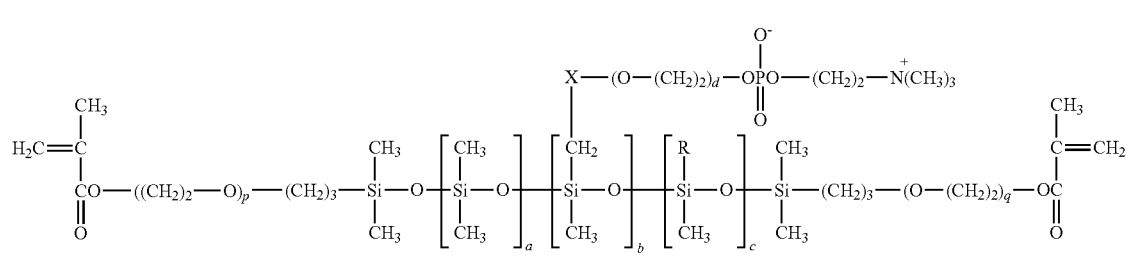

(1)

In the formula, a represents an integer of 20 to 500, b represents an integer of 1 to 70, c represents an integer of 1 to 70, d represents 0 or 1, p and q each represent 0 or 1, X represents —$CH_2$— or —$CH_2CH_2$—, and R represents an alkyl group having 2 to 18 carbon atoms.

Specifically, the present invention is as mentioned below.

[1] A phosphorylcholine group-containing polysiloxane monomer represented by the formula (1):

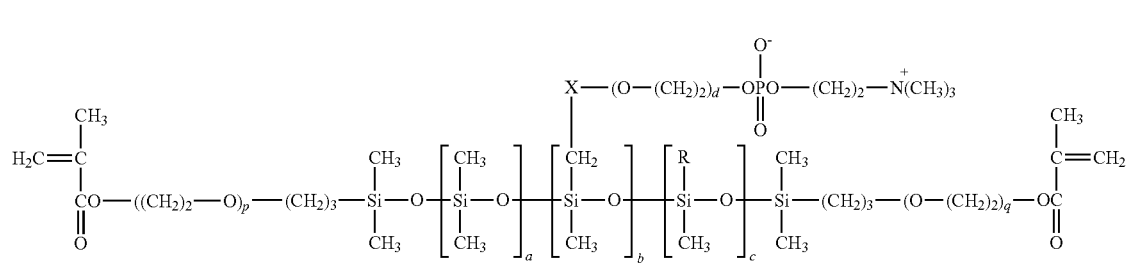

(1)

wherein a represents an integer of 20 to 500, b represents an integer of 1 to 70, c represents an integer of 1 to 70, d represents 0 or 1, p and q each represent 0 or 1, X represents —CH₂— or —CH₂CH₂—, and R represents an alkyl group having 2 to 18 carbon atoms.

[2] A method for producing a phosphorylcholine group-containing polysiloxane monomer represented by the formula (1), including a step of addition reaction of a hydrosilyl group-containing both-terminal methacryl-silicone represented by the formula (4) and a phosphorylcholine compound represented by the formula (6):

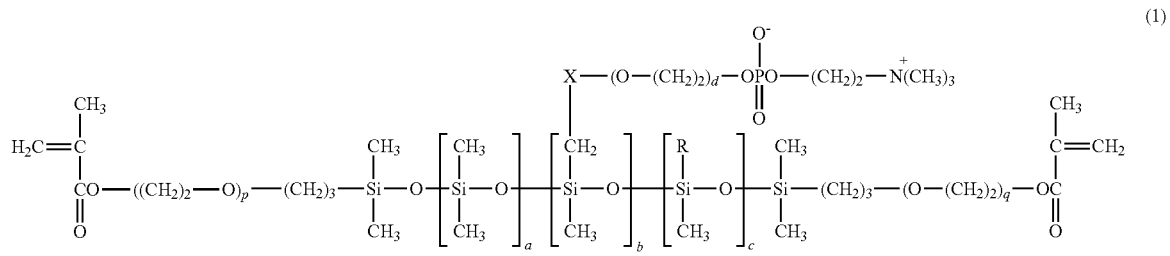

(1)

wherein a represents an integer of 20 to 500, b represents an integer of 1 to 70, c represents an integer of 1 to 70, d represents 0 or 1, p and q each represent 0 or 1, X represents —CH₂— or —CH₂CH₂—, and R represents an alkyl group having 2 to 18 carbon atoms,

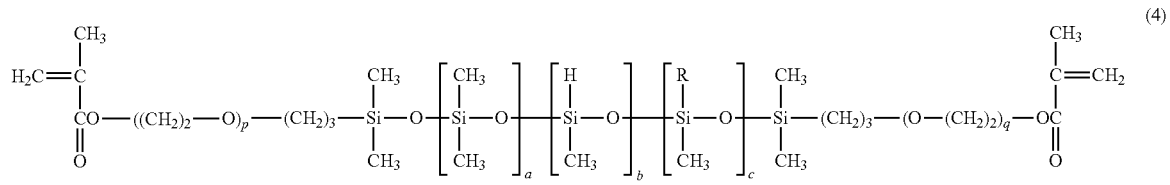

(4)

wherein a represents an integer of 20 to 500, b represents an integer of 1 to 70, c represents an integer of 1 to 70, p and q each represent 0 or 1, and R represents an alkyl group having 2 to 18 carbon atoms,

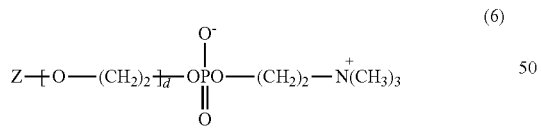

(6)

wherein d represents 0 or 1, and Z represents CH₂=CHCH₂— or CH₂=CH—.

[3] A monomer composition containing a phosphorylcholine group-containing polysiloxane monomer represented by the formula (1) in an amount of 10% by mass to 45% by mass, containing a hydroxy group-containing siloxanyl group-containing monomer represented by the formula (8) or the formula (9) in an amount of 10% by mass to 40% by mass, containing methacrylic acid in an amount of 0.1% by mass to 5% by mass, and containing a hydrophilic monomer other than methacrylic acid in an amount of 30% by mass to 70% by mass:

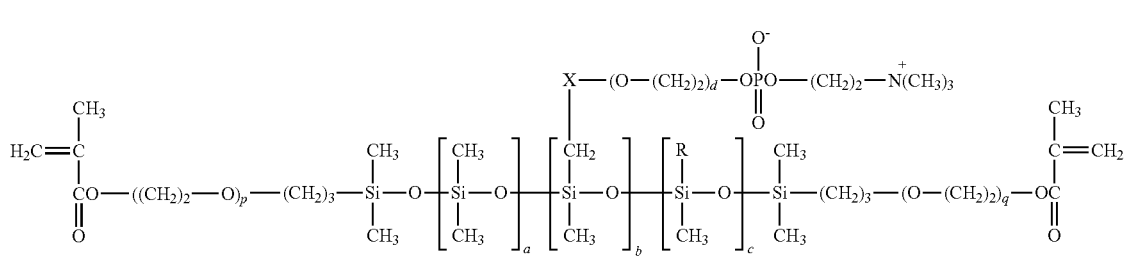

(1)

wherein a represents an integer of 20 to 500, b represents an integer of 1 to 70, c represents an integer of 1 to 70, d represents 0 or 1, p and q each represent 0 or 1, X represents —CH$_2$— or —CH$_2$CH$_2$—, and R represents an alkyl group having 2 to 18 carbon atoms, moiety, and further contains an amphoteric ionic phosphorylcholine group, an alkyl substituent and two vinyl terminal groups in the molecule.

The vinyl group in the phosphorylcholine group-containing polysiloxane monomer of the present invention is adja-

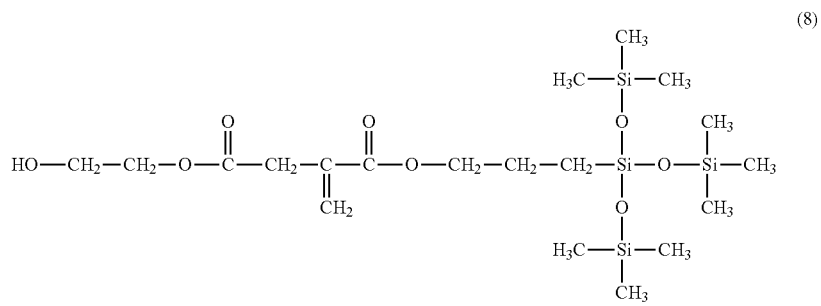

(8)

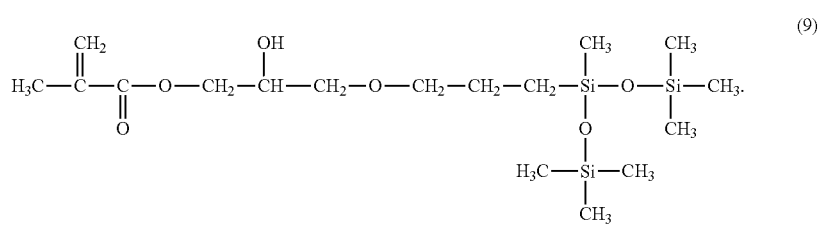

(9)

[4] A polymer produced by polymerizing the monomer composition of the above [3].

Advantageous Effects of Invention

The phosphorylcholine group-containing polysiloxane monomer of the present invention has high hydrophilicity as having a phosphorylcholine group, and therefore, when copolymerized with methacrylic acid or a hydrophilic monomer other than methacrylic acid, satisfies surface hydrophilicity and is therefore useful as a polysiloxane monomer for use as a material for ophthalmic devices. Further, as having an alkyl substituent structure in the side chain, this is a stable monomer having good compatibility with methacrylic acid.

DESCRIPTION OF EMBODIMENTS

The present invention relates to a polysiloxane monomer that contains an amphoteric ion group, a phosphorylcholine group. More precisely, the phosphorylcholine group-containing polysiloxane monomer of the present invention is a polymerizable silicone compound that contains a silicone cent to a carbonyl group. Consequently, the polysiloxane monomer is well copolymerizable with monomers that are generally used for ophthalmic devices, such as a methacrylic ester monomer and an acrylamide monomer.

The phosphorylcholine group-containing polysiloxane monomer of the present invention has an amphoteric ionic group, a phosphorylcholine moiety existing in the side chain thereof, and therefore has high compatibility with hydrophilic monomers, and polymerization thereof with hydrophilic monomers give transparent lenses.

The side chain of the phosphorylcholine group-containing polysiloxane monomer of the present invention contains an alkyl substituent, and provides stability to methacrylic acid.

Ophthalmic devices in the present invention include contact lenses, soft contact lenses, hard contact lenses, intraocular lenses and artificial corneas, but are not specifically limited thereto.

(Phosphorylcholine Group-Containing Polysiloxane Monomer of the Invention)

The phosphorylcholine group-containing polysiloxane monomer of the present invention is represented by the following formula (1):

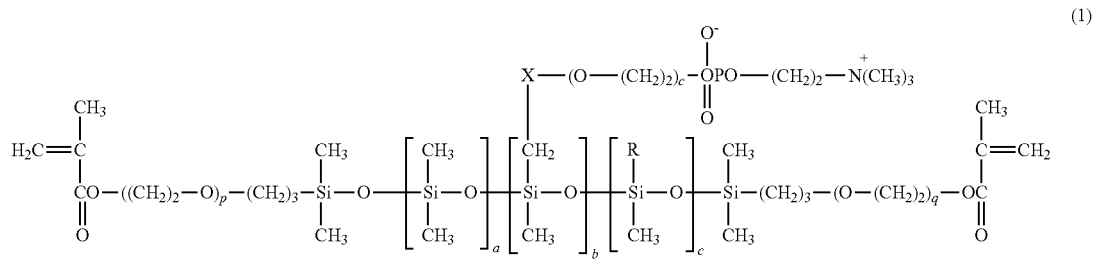

In the formula, a represents an integer of 20 to 500, b represents an integer of 1 to 70, c represents an integer of 1 to 70, d represents 0 or 1, p and q each represent 0 or 1, X represents —$CH_2$— or —$CH_2CH_2$—, and R represents an alkyl group having 2 to 18 carbon atoms.

a, b and c are not specifically limited so far as they each fall within the above range, and a is 20 to 500, preferably 20 to 300, more preferably 20 to 200, even more preferably 25 to 170, especially preferably 30 to 120, b is 1 to 70, preferably 1 to 40, more preferably 1 to 20, even more preferably 1 to 10, especially preferably 1 to 3, c is 1 to 70, preferably 1 to 40, more preferably 1 to 20, even more preferably 1 to 10, especially preferably 1 to 5.

R represents an alkyl group having 2 to 18 carbon atoms, including a linear structure and a branched structure (R=$C_nH_m$: n=2 to 18, m=2n+1), and is preferably one having 3 to 12 carbon atoms, more preferably having 3 to 8 carbon atoms. Examples thereof include a propyl group, a butyl group, a pentyl group, an isopentyl group, a hexyl group, an isohexyl group and an octyl group.

The number-average molecular weight of the phosphorylcholine group-containing polysiloxane monomer of the present invention is preferably 2,000 to 50,000. The number-average molecular weight can be measured according to a gel permeation chromatography (GPC) method.

(Synthesis Method for Phosphorylcholine Group-Containing Polysiloxane Monomer of the Invention)

The phosphorylcholine group-containing polysiloxane monomer of the present invention can be synthesized according to various methods with no specific limitation. For example, the following methods can be mentioned.

A silicone intermediate represented by the formula (2) that is used for synthesis of the phosphorylcholine group-containing polysiloxane monomer of the present invention can be synthesized according to a known method.

A both-terminal hydroxy group-containing siloxane represented by the following formula (2) (for example, terminal hydroxy group-containing disilane such as SIB1138.0 (in the formula (2), p=q=1, n=0) and SIB1145.0 (in the formula (2), p=q=n=0), both by Gelest, Inc.), and both-terminal hydroxy group-containing silicone such as FM-4411 (in the formula (2), p=q=1, n=9) by JNC Corporation) is reacted with a methacrylic acid chloride in the presence of a dehydrochlorinating agent to synthesize a compound having a both-terminal methacrylic group represented by the formula (3). As the dehydrochlorinating agent, an organic amine can be used. Preferably, an organic amine such as trialkylamine, e.g., triethylamine, a dialkylamine, e.g., diisopropylamine, or diazabicycloundecene can be used. In the reaction, an aprotic solvent can be used. From the viewpoint of solubility, tetrahydrofuran is preferred.

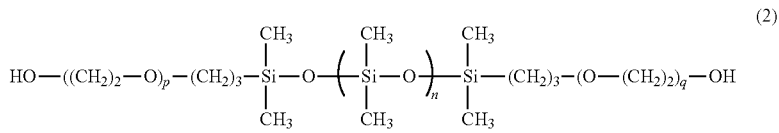

In the formula, p and q each represent 0 or 1, and n represents an integer of 0 to 10.

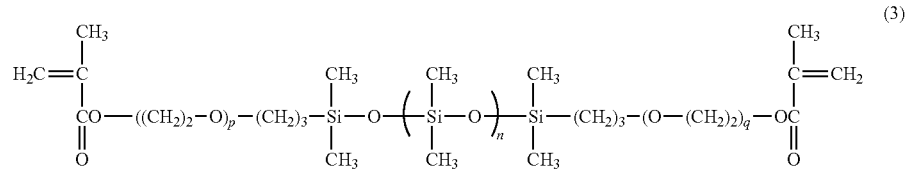

In the formula, p and q each represent 0 or 1, and n represents an integer of 0 to 10.

The compound represented by the formula (3) can be bought, for example, as FM-7711 (p=q=0, n=9) from JNC Corporation, DMS-R11 (p=q=0, n=9) from Gelest Inc., and X22-164AS (p=q=0, n=9) from Shin-Etsu Chemical Co., Ltd.

An alkyl group-containing cyclic silicone represented by the formula (7) that is used for synthesis of the phosphorylcholine group-containing polysiloxane monomer of the present invention can be synthesized according to a known method. In the formula (7), R represents an alkyl group having 2 to 18 carbon atoms, and includes linear and branched structures. ($R=C_nH_m$: n=2 to 18, m=2n+1)

Examples of R include an ethyl group, a propyl group, a butyl group, a pentyl group, an isopentyl group, a hexyl group, an isohexyl group, and an octyl group.

The alkyl group-containing cyclic silicone represented by the formula (7) can be synthesized by hydrosilylation reaction, that is, addition reaction between 1,3,5,7-tetramethylcyclotetrasiloxane and various alkenes each having 2 to 18 carbon atoms (e.g., ethylene, propylene, butylene, pentylene, hexylene, 2-methylpentylene). As needed, the catalyst used in the reaction can be removed by adsorption treatment or liquid-liquid separation, and the unreacted components can be removed by pressure reduction.

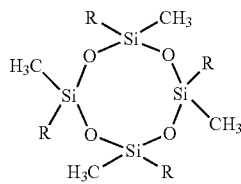

(7)

Next, the both-terminal methacrylic group-having compound represented by the formula (3) is reacted with octamethylcyclotetrasiloxane, 1,3,5,7-tetramethylcyclotetrasiloxane or the alkyl group-containing cyclic silicone represented by the general formula (7), using an acid catalyst, for example, trifluoromethanesulfonic acid to give a hydrosilyl group-containing silicone intermediate (hydrosilyl group-containing both-terminal methacrylsilicone) represented by the formula (4). In this, a solvent can be absent, or a solvent such as chloroform can be used.

preferably 1 to 10, especially preferably 1 to 3, c is 1 to 70, preferably 1 to 40, more preferably 1 to 20, even more preferably 1 to 10, especially preferably 1 to 5.

After the reaction, the acid catalyst is removed by a known method. For example, the catalyst can be removed by washing with water or by adsorption with sodium hydrogencarbonate.

Further, the hydrosilyl group-containing both-terminal methacrylsilicone represented by the formula (4) is hydrosilylated by addition reaction with a phosphorylcholine compound represented by the formula (6), then an excessive amount of the compound of the formula (6) is removed with a solvent or the like, and a low-boiling point component is removed by pressure reduction to give the phosphorylcholine group-containing polysiloxane monomer of the formula (1).

The compound of the formula (6) can be produced by reacting an alcohol represented by the formula (5) and 2-chloro-2-oxo-1,3,2-dioxaphospholane (COP) in an aprotic solvent such as acetonitrile, and then further reacted with trimethylamine in an aprotic solvent such as acetonitrile.

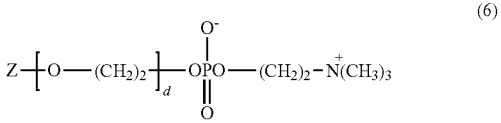

(5)

In the formula, d represents 0 or 1, and Z represents $CH_2=CHCH_2-$ or $CH_2=CH-$.

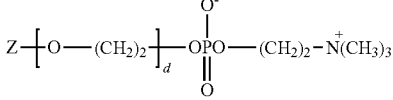

(6)

In the formula, d represents 0 or 1, and Z represents $CH_2=CHCH_2-$ or $CH_2=CH-$.

(Monomer Composition of the Invention)

The monomer composition of the present invention contains a phosphorylcholine group-containing polysiloxane monomer represented by the formula (1) in an amount of 10% by mass to 45% by mass, contains a hydroxy group-containing siloxanyl group-containing monomer represented by the formula (8) or the formula (9) in an amount of

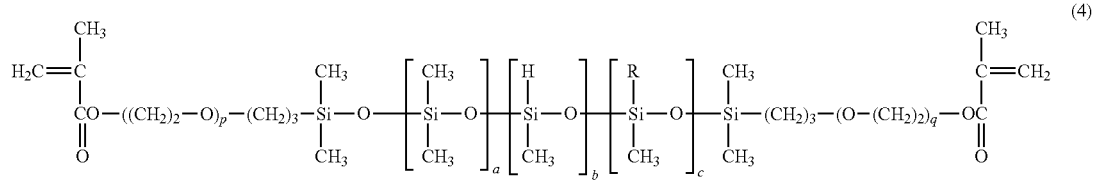

(4)

In the formula, a represents an integer of 20 to 500, b represents an integer of 1 to 70, c represents an integer of 1 to 70, p and q each represent 0 or 1, and R represents an alkyl group having 2 to 18 carbon atoms.

a, b and c are not specifically limited so far as they each fall within the above range, and a is 20 to 500, preferably 20 to 300, more preferably 20 to 200, even more preferably 25 to 170, especially preferably 30 to 120, b is 1 to 70, preferably 1 to 40, more preferably 1 to 20, even more 10% by mass to 40% by mass, contains methacrylic acid in an amount of 0.1% by mass to 5% by mass, and contains a hydrophilic monomer other than methacrylic acid in an amount of 30% by mass to 70% by mass.

The phosphorylcholine group-containing polysiloxane monomer represented by the formula (1) that is contained in the monomer composition of the present invention can be polymerized with a hydrophilic monomer or the like, using a catalyst or an initiator known to those skilled in the art.

In the monomer composition of the present invention, the content ratio of the phosphorylcholine group-containing polysiloxane monomer represented by the formula (1) of the present invention is 10% by mass to 45% by mass based on the total amount of the composition, preferably 15 to 35% by mass. When the content is less than 10% by mass, the polymer stability lowers, but when the content is more than 45% by mass, the polymer surface hydrophilicity lowers.

The monomer composition of the present invention contains a hydroxy group-containing siloxanyl group-containing monomer represented by the formula (8) or the formula (9). Such a hydroxy group-containing siloxanyl group-containing monomer can be favorably used as a material for ophthalmic devices.

total amount of the composition, preferably 40 to 60% by mass. When the content is less than 30% by mass, the effect of improving the hydrophilicity of the ophthalmic device to be obtained could not be attained sufficiently, but when the content is more than 70% by mass, the polymer transparency lowers.

(Other Monomers)

The monomer composition of the present invention can contain any other monomer which is polymerizable with the phosphorylcholine group-containing polysiloxane monomer represented by the formula (1) of the present invention and preferably which is usable as a material for ophthalmic devices, in addition to the above-mentioned indispensable monomer. The other monomer can be added as a crosslink-

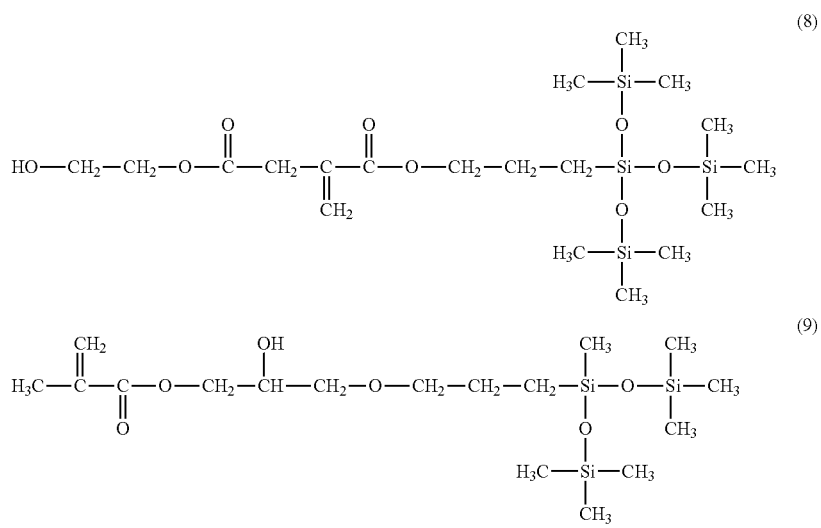

The content ratio of the hydroxy group-containing siloxanyl group-containing monomer represented by the formula (8) or the formula (9) is 10% by mass to 40% by mass based on the total amount of the composition, preferably 20% by mass to 35% by mass. When the content is less than 10% by mass, the polymer transparency lowers, but when the content is more than 40% by mass, the polymer surface hydrophilicity lowers.

The monomer composition of the present invention contains methacrylic acid. Containing methacrylic acid, the hydrophilicity of the ophthalmic device to be formed of the composition can readily improve. The content ratio of methacrylic acid is 0.1% by mass to 5% by mass based on the total amount of the composition, preferably 0.2 to 2% by mass. When the content is less than 0.1% by mass, the effect of improving the hydrophilicity of the ophthalmic device to be obtained could not be attained sufficiently, but when the content is more than 5% by mass, the polymer stability lowers.

The monomer composition of the present invention contains a hydrophilic monomer other than methacrylic acid. The hydrophilic monomer other than methacrylic acid is preferably selected from the group consisting of 2-hydroxyethyl methacrylate, N-vinylpyrrolidone, N,N-dimethylacrylamide, 2-(methacryloyloxyethyl)-2-(trimethylammonioethyl) phosphate, methyl methacrylate, hydroxypropyl methacrylate, hydroxybutyl methacrylate, and mixtures thereof.

The content of the hydrophilic monomer other than methacrylic acid is 30% by mass to 70% by mass based on the ing agent within a range not detracting from the advantageous effects of the present invention. Examples thereof include tetraethylene glycol dimethacrylate and triethylene glycol divinyl ether.

The content ratio of the crosslinking agent is generally 10 parts by mass or less relative to 100 parts by mass of the total of the monomer composition of the present invention, preferably 5 parts by mass or less.

(Polymer of Invention)

The polymer of the present invention can be produced by polymerizing the monomer composition of the present invention.

The polymerization can be carried out according to a known method by appropriately adding a thermal polymerization initiator such as typically a peroxide or an azo compound, or a photopolymerization initiator.

In thermal polymerization, those having optimum decomposition characteristics at a desired reaction temperature can be selected and used. Specifically, a peroxide or an azo compound having a 10-hour half-life temperature of 40 to 120° C. is preferred. Examples of the azo compound include AIBN.

Examples of the photopolymerization initiator include a carbonyl compound, a sulfur compound, a halogen compound and a metal salt.

These polymerization initiators can be used either alone or as mixed, and are preferably used in a ratio of 0.2 to 2 parts by mass to 100 parts by mass of the monomer composition of the present invention.

The polymer of the present invention is excellent in surface hydrophilicity and stability and therefore can be favorably used for ophthalmic devices such as contact lenses, soft contact lenses, hard contact lenses, intraocular lenses and artificial corneas.

EXAMPLES

Hereinunder the present invention is described in more detail with reference to Examples and Comparative Examples, but the present invention is not limited to these.

[Synthesis Example 1] Synthesis of Alkyl Group-Containing Cyclic Silicone Represented by Formula (7) (Case of R: Hexyl)

In a 250-mL four-neck flask, 8.75 g (104 mmol) of 1-hexene (by Tokyo Chemical Industry Co., Ltd.) was dissolved in the same amount, 8.75 g of toluene, and 100 μL of platinum(0)-1,3-divinyltetramethyldisiloxane complex (by Sigma-Aldrich Japan) was added thereto. After this was heated up to 25° C., a solution prepared by dissolving 5.0 g (20.8 mmol) of 1,3,5,7-tetramethylcyclotetrasiloxane (by Tokyo Chemical Industry Co., Ltd.) that had been prepared separately, in the same amount of toluene was dropwise added thereto taking 30 minutes for entire addition. After dropwise addition, this was reacted at 25° C. for 1 hour, and then 13.74 g of heptane and 0.5 g of active carbon were added and further stirred for 1 hour. Subsequently, this was filtered to remove active carbon, and the solvent was removed under reduced pressure to give 11.37 g of a product. This was identified as a compound of the formula (7) (R: hexyl) by 1H NMR.

[Synthesis Example 2] Synthesis of Phosphorylcholine Compound Represented by Formula (6)

In a 1-L four-neck flask, 97.26 g (0.68 mol) of 2-chloro-2-oxo-1,3,2-dioxaphospholane (COP) was dissolved in 389.03 g of acetonitrile, and cooled down to 5° C. or lower in an ice bath. A solution prepared by dissolving 66.38 g (0.65 mol) of ethylene glycol monoallyl ether (by Tokyo Chemical Industry Co., Ltd.) and 69.07 g (0.68 mol) of triethylamine (by Kishida Chemical Co., Ltd.) in 135.45 g of acetonitrile in a 500-mL beaker was transferred into a 300 mL dropping funnel, and dropwise added to the previous COP solution taking 1 hour. Further, this was reacted for 4 hours in an ice bath. The triethylamine hydrochloride formed by the reaction was taken out by filtration, then 61.46 g (1.04 mol) of trimethylamine was added, and reacted at 75° C. for 8 hours. After cooled, the formed product was taken out by filtration, and washed two times with 140 g of acetone. The solvent was removed under reduced pressure to give 104.1 g of a product. This was identified as a compound of the formula (6) (d is 1, and Z is $CH_2=CHCH_2-$) by 1H NMR.

[Synthesis Example 3] Synthesis of Hydrosilyl Group-Containing Both-Terminal Methacrylsilicone Represented by Formula (4)

In a 500-mL light-shielding bottle, 10.27 g of X22-164AS (by Shin-Etsu Chemical Industrial Co., Ltd., both terminal methacryloyloxypropylpolydimethylsiloxane (molecular weight, about 1,000)), 43.7 g of octamethylcyclotetrasiloxane, 2.25 g of 1,3,5,7-tetramethylcyclotetrasiloxane, and 5.40 g of alkyl group-containing cyclic silicone represented by the formula (7) (R: hexyl) were mixed, and further 0.09 g of trifluoromethanesulfonic acid was added thereto. This was reacted at 25° C. for 18 hours, and then the reaction was stopped by neutralization with 0.52 g of sodium hydrogencarbonate added thereto. Subsequently, 6.16 g of sodium sulfate was added for dehydration for 30 minutes. Sodium hydrogencarbonate and sodium sulfate were removed by filtration to give 58.70 g of a transparent liquid. This was identified as a hydrosilyl group-containing both-terminal methacrylsilicone represented by the formula (4) (referred to as a silicone intermediate 1) by 1H NMR.

1H NMR Analysis Data 2H peak area value of terminal double bond at 5.54 and 6.10 ppm (1.00+1.01=2.01)

1H area value derived from hydrosilyl group at 4.68 ppm (3.49)

8H area value derived from hexyl group at 1.31 ppm (30.8)

Peak area value derived from siloxane at 0.16 ppm (428.13)

From the above, in the structure of the formula (4), a=nearly 71, b=3, c=4, p=0 and q=0, and the number-average molecular weight Mn=nearly 4500. The number-average molecular weight is a value measured by gel permeation chromatography (GPC) and calculated based on PMMA (polymethyl methacrylate) as a standard.

Analysis Condition in Example 1

The analysis condition in Example 1 is shown below.

1H NMR Measurement Method

Measurement device: JNM-AL400 by JEOL Corporation

Solvent: CDCl3 (based on the peak 7.26 ppm of CDCl3)

Components Used in Example 2 and Comparative Examples

Other components than the polysiloxane monomer of the present invention, used in Example 2 and Comparative Examples, are shown below.

Comparative compound for formula (1)
  FM-7721: by JNC Corporation, both terminal methacryloyloxypolydimethylsiloxane (molecular weight=nearly 5,000)

Hydroxy group-containing siloxanyl group-containing monomer
  SiGMA: 2-hydroxy-3-(tris(trimethylsiloxy)silyl)propyl methacrylate
  ETS: 4-(2-hydroxyethyl)=1-[3-tris(trimethylsiloxy)silylpropyl]=2-methylidene succinate MMA: methacrylic acid Hydrophilic monomer
  DMAA: N,N-dimethylacrylamide
  HBMA: hydroxybutyl methacrylate (2-hydroxypropyl ester, 2-hydroxy-1-methylethyl ester mixture, by Nippon Shokubai Co., Ltd.
  NVP: N-vinylpyrrolidone
  MPC: 2-(methacryloyloxyethyl)-2-(trimethylammonioethyl) phosphate Other monomer
  TEGDMA: tetraethylene glycol dimethacrylate Solvent
  HexOH: hexanol Initiator (polymerization initiator)
  AIBN: 2,2'-azobis(isobutyronitrile) (10-hour half-life temperature 65° C.)

Evaluation methods in Example 2 are as follows. Film samples produced in Examples were evaluated according to the evaluation method for contact lenses mentioned below.

(Surface Hydrophilicity of Contact Lens (Film Sample) (WBUT))

The surface hydrophilicity of film samples was evaluated by WBUT (water film break up time). Precisely, a film sample was immersed overnight in an ISO physiological saline, and pulled up from the water surface by picking up the outer periphery thereof by tweezers. The period of time from the time when the sample was pulled up from the water surface to the time when the water film on the film sample surface broke (water film retention time) was measured. The water film broken condition was visually checked. The measurement was repeated three times, and an average value was calculated. A case having a water film retention time of 15 seconds or more is determined to have good surface hydrophilicity.

(Water Content of Contact Lens (Film Sample))

The water content was measured according to the method described in ISO-18369-4.

(Stability of Contact Lens (Film Sample))

A film sample immersed in a physiological saline described in ISO-18369-3 was stored in a constant-temperature tank at 60° C., and after one month, the water content thereof was measured in the manner as above (the data are described as "water content after treatment" in Tables), and the data were compared with the initial data for stability evaluation. A case having a water content change rate of ±1% or less is determined to have sufficient stability (Rank A) and a case having more than +1% to 2% is determined to have good stability (Rank B).

Example 1-1

In a 100-mL three-neck flask, 5.00 g of the silicone intermediate 1 (hydrosilyl group-containing both-terminal methacrylsilicone represented by the formula (4)) and 1.218 g of the phosphorylcholine compound represented by the formula (6) were dissolved in 7.699 g of 2-propanol and 3.85 g of heptane, and heated using an oil bath, and thereafter 105 μL of a 2-propanol solution of 4 mass % trioctylamine and 52 μL of a 2-propanol solution of 4 mass % hexachloroplatinic acid hexahydrate were added thereto. Subsequently, this was reacted for 4 hours under reflux. After the reaction, 17.90 g of ion-exchanged water, 7.16 g of 2-propanol and 3.580 g of heptane were mixed therein and stirred. After left to stand as such, this was separated into two layers, and the lower layer was discarded. Subsequently, the process of mixing with ion-exchanged water, 2-propanol and heptane, stirring and discarding the lower layer was repeated two times, and 4.73 g of a transparent gel substance was taken from the upper layer by reduced pressure distillation. This was identified as the compound represented by the formula (1) by 1H NMR.

1H NMR Analysis Data 2H peak area value of terminal double bond at 5.54 and 6.10 ppm (1.00+1.00=2.00)

11H area value derived from phosphorylcholine group at 3.34 ppm (19.38)

8H area value derived from hexyl group at 1.31 ppm (32.44)

Peak area value derived from siloxane at 0.16 ppm (421.30)

From the above, in the structure of the formula (1), a=nearly 70, b=2, c=4, p=q=0, and X is $-CH_2CH_2-$, and the number-average molecular weight Mn was calculated to be nearly 4600. The number-average molecular weight is a value measured by gel permeation chromatography (GPC) and calculated based on PMMA (polymethyl methacrylate) as a standard under the following condition.

Eluent: mixed solution of methanol and chloroform (methanol/chloroform=4/6 (vol %/vol %)+0.5 wt % LiBr)

Column: Polargel-Lx1, Polargel-Mx1 (connected in series)

Flow rate: 1.0 mL/min

Detector: differential refractometer

Column oven temperature: 40° C.

Example 1-2 to Example 1-6

In [Synthesis Example 1], propene or isohexene was used in place of 1-hexene was reacted in a five-fold equivalent amount relative to 1,3,5,7-tetramethylcyclotetrasiloxane to synthesize an alkyl group-containing cyclic silicone of the formula (7) where R is a propyl group or an isohexyl group. Using the compounds of the formula (7) differing in the moiety of R, hydrosilyl group-containing both-terminal methacrylsilicones of the formula (4) were synthesized differing from each other in the molecular weight and the hydrosilyl group content. Subsequently, in Example 1-2 to Example 1-6, the same manner as in Example 1-1 was carried out except that the amount of the compound of the formula (6) was varied in proportion to the concentration of the hydrosilyl group. The molar ratio of the structural units and the calculation results of the number-average molecular weight in Example 1-1 to Example 1-6 are shown in Table 1.

TABLE 1

| | Example 1-1 | Example 1-2 | Example 1-3 | Example 1-4 | Example 1-5 | Example 1-6 |
|---|---|---|---|---|---|---|
| Formula (1) a | 70 | 73 | 71 | 152 | 42 | 41 |
| Formula (1) b | 2 | 2 | 2 | 4 | 2 | 2 |
| Formula (1) c | 4 | 4 | 4 | 8 | 2 | 2 |
| Structure: R | hexyl | propyl | isohexyl | isohexyl | hexyl | isohexyl |
| Formula (1) d | 1 | 1 | 1 | 1 | 1 | 1 |
| Formula (1) p | 0 | 0 | 0 | 0 | 0 | 0 |
| Formula (1) q | 0 | 0 | 0 | 0 | 0 | 0 |
| Formula (1) X | $-CH_2CH_2-$ | $-CH_2CH_2-$ | $-CH_2CH_2-$ | $-CH_2CH_2-$ | $-CH_2CH_2-$ | $-CH_2CH_2-$ |
| Number-average Molecular Weight | 4600 | 4400 | 5000 | 10100 | 2900 | 2700 |

Example 2-1

9.89 parts by mass of DMAA, 9.89 parts by mass of HBMA, 29.71 parts by mass of NVP, 19.81 parts by mass of the compound produced in Example 1-1, 0.99 parts by mass of MAA, 29.71 parts by mass of ETS, 29.71 parts by mass of HexOH, 0.99 parts by mass of TEGDMA, and 0.49 parts by mass of AIBN were mixed with stirring at room temperature for 1 hour, and uniformly dissolved to give a monomer composition. The formulation is shown in Table 2.

0.3 g of the above monomer composition was cast into a cell of 25 mm×70 mm×0.2 mm sandwiched between two polypropylene plates via a polyethylene terephthalate sheet having a thickness of 0.1 mm serving as a spacer, and put in an oven. The oven was purged with nitrogen, heated up to 100° C. and kept at the temperature for 2 hours to polymerize the composition to give a polymer.

The polymer was immersed in 40 g of 2-propanol for 4 hours, and then immersed in 50 g of ion-exchanged water for 4 hours to remove the unreacted substances for purification. Further, the polymer was immersed in a physiological saline described in ISO-18369-3 to give a transparent film sample. The composition uniformity and the polymer transparency of the sample were observed and, as a result, both were good as shown in Table 2.

The water content, the surface hydrophilicity (WBUT measurement), the stability test, and the water content in the stability test of the film sample were evaluated according to the above-mentioned methods. The results are shown in Table 2.

Example 2-2 to Example 2-7

According to the formulation shown in Table 2, Example 2-2 to Example 2-7 were carried out in the same manner as in Example 2-1. The composition uniformity, the polymer transparency, the surface hydrophilicity, the water content and the stability were evaluated in the same manner as in Example 2-1, and the results are shown in Table 2. All these Examples were confirmed to have composition uniformity and polymer transparency. The water film retention time in WBUT measurement was 15 seconds or more in all these Examples, which were therefore confirmed to have sufficient surface hydrophilicity. Further, the water content change was 1% or 2% or less, and the stability was also recognized.

Comparative Example 2-1

As shown in Table 3, 29.71 parts by mass of FM-7721 as a comparative compound for the formula (1) was used in place of the compound represented by the formula (1), but a uniform solution could not be produced (in Table 3, described as "not good").

Comparative Example 2-2

As shown in Table 3, 9.90 parts by mass of FM-7721 as a comparative compound for the formula (1) was used in place of the compound represented by the formula (1), and composition uniformity and polymer transparency were confirmed, but surface hydrophilicity was low, and further, the water content change in the stability test was over 2%, that is, the stability could not be said to be sufficient (Rank C).

Accordingly, the polymer obtained by polymerizing the monomer composition containing a polysiloxane monomer represented by the formula (1) was confirmed to exhibit good surface hydrophilicity and have sufficient stability even in the presence of methacrylic acid.

TABLE 2

| Kind | | Material | Example 2-1 mixing ratio | Example 2-2 mixing ratio | Example 2-3 mixing ratio | Example 2-4 mixing ratio | Example 2-5 mixing ratio | Example 2-6 mixing ratio | Example 2-7 mixing ratio |
|---|---|---|---|---|---|---|---|---|---|
| Compound of Formula (1) | part by mass | Example 1-1 | 19.81 | | | | | | |
| | | Example 1-2 | | 19.81 | | | | | |
| | | Example 1-3 | | | 19.81 | 19.81 | | | |
| | | Example 1-4 | | | | | 29.71 | | |
| | | Example 1-5 | | | | | | 19.81 | |
| | | Example 1-6 | | | | | | | 19.81 |
| Comparative Compound for Formula (1) | | FM-7721 | | | | | | | |
| Hydrophilic Monomer | | DMAA | 9.89 | 9.89 | 9.89 | 9.89 | 9.90 | 9.89 | 9.89 |
| | | HBMA | 9.89 | 9.89 | 9.89 | 9.89 | 9.90 | 14.85 | 14.85 |
| | | NVP | 29.71 | 29.71 | 29.71 | 19.81 | 29.71 | 24.75 | 24.75 |
| | | MPC | | | | 9.90 | | | |
| Methacrylic Acid | | MAA | 0.99 | 0.99 | 0.99 | 0.99 | 0.99 | 0.99 | 0.99 |
| Hydroxy Group-containing Siloxanyl Group-containing Monomer | | ETS | 29.71 | | | | | 29.71 | 29.71 |
| | | SiGMA | | 29.71 | 29.71 | 29.71 | 19.79 | | |
| Total of Monomers | | — | 100.00 | 100.00 | 100.00 | 100.00 | 100.00 | 100.00 | 100.00 |
| Crosslinking Agent Monomer | | TEGDMA | 0.99 | 0.99 | 0.99 | 0.99 | 1.46 | 0.99 | 0.99 |
| Solvent | | HexOH | 29.71 | 29.71 | 29.71 | 29.71 | 29.71 | 39.60 | 39.60 |
| Initiator | | AIBN | 0.49 | 0.49 | 0.49 | 0.49 | 0.49 | 0.49 | 0.49 |
| Polymerization Step | | Temperature | 100° C. | 100° C. | 100° C. | 100° C. | 100° C. | 100° C. | 100° C. |
| | | Time | 2 hrs | 2 hrs | 2 hrs | 2 hrs | 2 hrs | 2 hrs | 2 hrs |

TABLE 2-continued

| Kind | Material | Example 2-1 mixing ratio | Example 2-2 mixing ratio | Example 2-3 mixing ratio | Example 2-4 mixing ratio | Example 2-5 mixing ratio | Example 2-6 mixing ratio | Example 2-7 mixing ratio |
|---|---|---|---|---|---|---|---|---|
| Evaluation Items | | Evaluation Results | | | | | | |
| Composition Uniformity | | good | good | good | good | good | good | good |
| Polymer Transparency | | good | good | good | good | good | good | good |
| WBUT [s] | | 25 | 25 | 25 | 30 | 20 | 25 | 25 |
| Water Content [%] (initial value) | | 55 | 59 | 54 | 56 | 55 | 45 | 45 |
| Stability (water content [%] after treatment) | | A (55) | A (59) | A (54) | A (56) | B (54) | A (45) | A (45) |

TABLE 3

| Kind | | Material | Comparative Example 2-1 mixing ratio | Comparative Example 2-2 mixing ratio |
|---|---|---|---|---|
| Compound of Formula (1) | part by mass | Example 1-1 Example 1-2 Example 1-3 Example 1-4 Example 1-5 Example 1-6 | | |
| Comparative Compound for Formula (1) | | FM-7721 | 29.71 | 9.90 |
| Hydrophilic Monomer | | DMAA | 9.89 | 9.90 |
| | | HBMA | 9.89 | 9.90 |
| | | NVP | 29.71 | 29.71 |
| | | MPC | | |
| Methacrylic Acid | | MAA | 0.99 | 0.99 |
| Hydroxy Group-containing Siloxanyl Group-containing Monomer | | ETS SIGMA | 19.81 | 39.60 |
| Total of Monomers | | — | 100.00 | 100.00 |
| Crosslinking Agent Monomer | | TEGDMA | 0.99 | 1.46 |
| Solvent | | HexOH | 29.71 | 29.71 |
| Initiator | | AIBN | 0.49 | 0.49 |
| Polymerization Step | | Temperature Time | 100° C. 2 hrs | 100° C. 2 hrs |
| Evaluation Items | | | Evaluation Results | |
| Composition Uniformity | | | not good | good |
| Polymer Transparency | | | Since the system did not dissolve uniformly, the test stopped. | good |
| WBUT [s] | | | | 5 |
| Water Content [%] (initial value) | | | | 48 |
| Stability (water content [%] after treatment) | | | | C (52) |

The above confirmed that the phosphorylcholine group-containing polysiloxane monomer of the present invention satisfies surface hydrophilicity and has stability owing to good compatibility with methacrylic acid, when copolymerized with a polymerizable monomer such as a hydrophilic monomer, and is therefore useful as a polysiloxane monomer for use as a material for ophthalmic devices.

INDUSTRIAL APPLICABILITY

The phosphorylcholine group-containing polysiloxane monomer of the present invention gives, when copolymerized with a polymerizable monomer such as methacrylic acid or a hydrophilic monomer other than methacrylic acid, a polymer that exhibits surface hydrophilicity and sufficient stability as ophthalmic devices.

The invention claimed is:

1. A phosphorylcholine group-containing polysiloxane monomer represented by the formula (1):

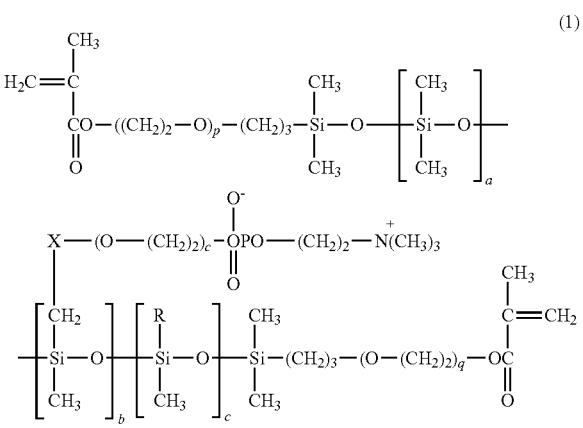

wherein a represents an integer of 20 to 500, b represents an integer of 1 to 70, c represents an integer of 1 to 70, d represents 0 or 1, p and q each represent 0 or 1, X represents —$CH_2$— or —$CH_2CH_2$—, and 11 represents an alkyl group having 2 to 18 carbon atoms.

2. A method for producing a phosphorylcholine group-containing polysiloxane monomer represented by the formula (1), comprising a step of addition reaction of a hydrosilyl group-containing both-terminal methacrylsilicone represented by the formula (4) and a phosphorylcholine compound represented by the formula (6):

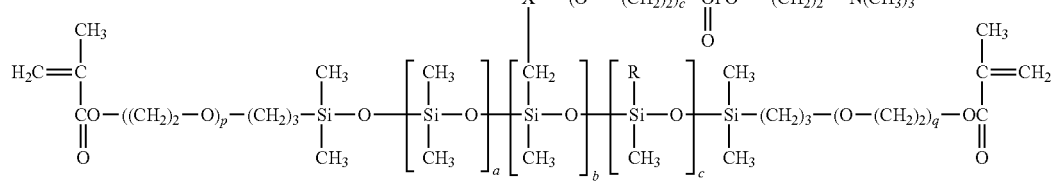

wherein a represents an integer of 20 to 500, b represents an integer of 1 to 70, c represents an integer of 1 to 70, d represents 0 or 1, p and q each represent 0 or 1, X represents —CH$_2$— or —CH$_2$CH$_2$—, and R represents an alkyl group having 2 to 18 carbon atoms,

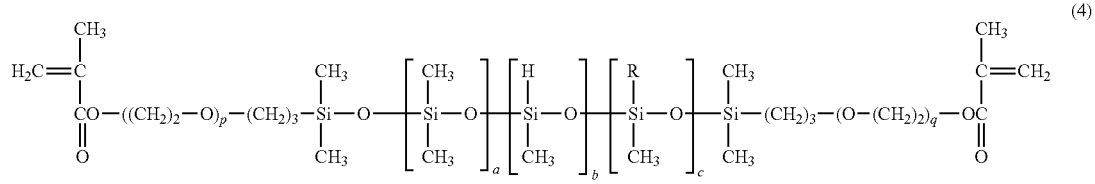
(4)

wherein a represents an integer of 20 to 500, b represents an integer of 1 to 70, c represents an integer of 1 to 70, p and q each represent 0 or 1, and R represents an alkyl group having 2 to 18 carbon atoms,

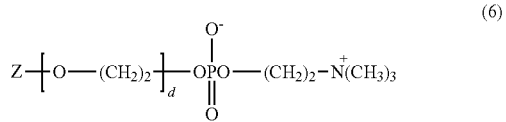
(6)

wherein d represents 0 or 1, and Z represents CH$_2$=CHCH$_2$— or CH$_2$=CH—.

3. A monomer composition containing a phosphorylcholine group-containing polysiloxane monomer represented by the formula (1) in an amount of 10% by mass to 45% by mass, containing a hydroxy group-containing siloxanyl group-containing monomer represented by the formula (8) or the formula (9) in an amount of 10% by mass to 40% by mass, containing methacrylic acid in an amount of 0.1% by mass to 5% by mass, and containing a hydrophilic monomer other than methacrylic acid in an amount of 30% by mass to 70% by mass:

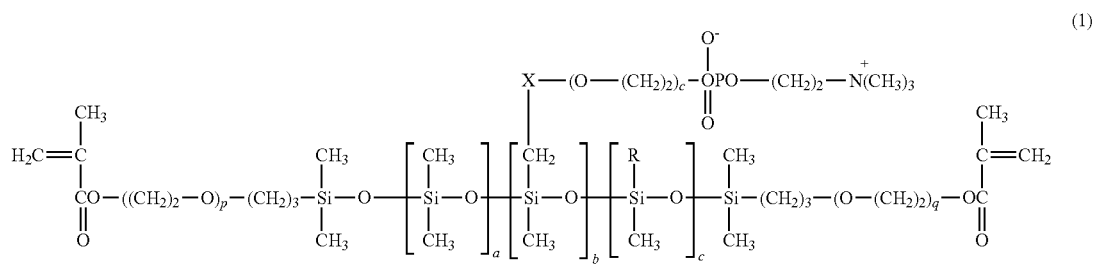
(1)

wherein a represents an integer of 20 to 500, b represents an integer of 1 to 70, c represents an integer of 1 to 70, d represents 0 or 1, p and q each represent 0 or 1, X represents —CH$_2$— or —CH$_2$CH$_2$—, and R represents an alkyl group having 2 to 18 carbon atoms,

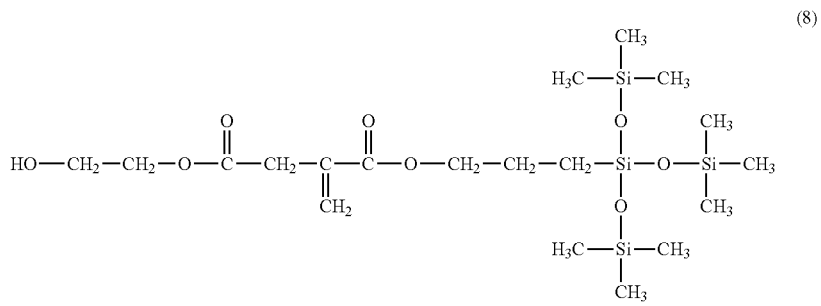
(8)

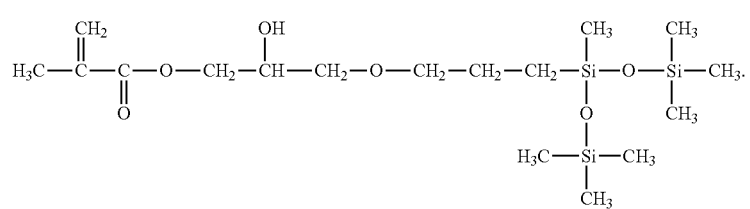
(9)
4. A polymer produced by polymerizing the monomer composition of claim 3.
* * * * *